Figure 1:
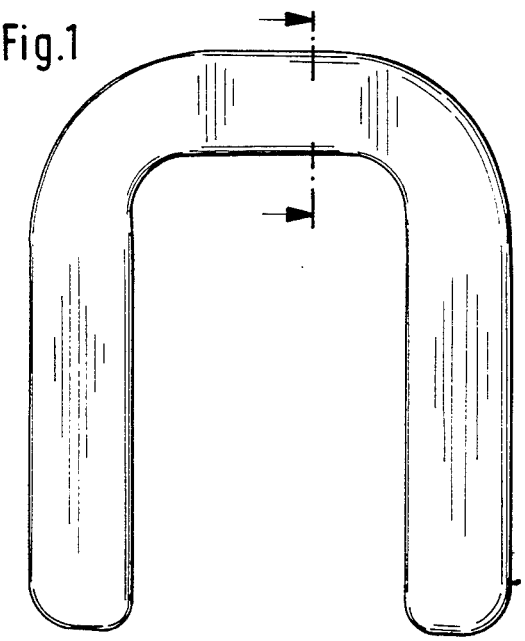

United States Patent [19]

Simon

[11] Patent Number: 4,949,428
[45] Date of Patent: Aug. 21, 1990

[54] CLOSING CLIP FOR SAUSAGE CASINGS AND THE LIKE

[75] Inventor: Dieter Simon, Reinbek, Fed. Rep. of Germany

[73] Assignee: technopack Ewald Hagedorn KG (GmbH & Co), Hamburg, Fed. Rep. of Germany

[21] Appl. No.: 335,059

[22] Filed: Apr. 7, 1989

[30] Foreign Application Priority Data

Apr. 11, 1988 [DE] Fed. Rep. of Germany ....... 3811978

[51] Int. Cl.⁵ ............................................. A22C 21/00
[52] U.S. Cl. ......................................... 17/1 R; 17/49; 383/71
[58] Field of Search ................. 17/49, 1 R; 383/71; 24/30.5 W, 30.5 R, 115 A; 229/65

[56] References Cited

U.S. PATENT DOCUMENTS

| | | | |
|---|---|---|---|
| 4,131,975 | 1/1979 | Niedecker | 383/71 |
| 4,166,571 | 9/1979 | Niedecker | 383/71 |
| 4,200,962 | 5/1980 | Niedecker | 383/71 |
| 4,753,539 | 6/1988 | Collie et al. | 383/71 |

*Primary Examiner*—Willis Little
*Attorney, Agent, or Firm*—Chilton, Alix & Van Kirk

[57] ABSTRACT

A closing clip for sausage casings and the like, formed from a metal strip which is to be bent round the gathered casing end and of which the bearing surface resting against the casing end contains a friction-increasing impression. The impressions are provided so as to cover essentially the entire area.

15 Claims, 1 Drawing Sheet

CLOSING CLIP FOR SAUSAGE CASINGS AND THE LIKE

The invention relates to a closing clip for sausage casings and the like, formed from a metal strip which is to be bent round the gathered casing end and of which the bearing surface resting against the casing end contains a friction-increasing impression.

Closing clips for sausage casings are known in the form of wire pieces which are bent in a U-shaped manner and which are bent together round the gathered casing ends in such a way that their bearing surface rests against the casing under prestress and is held on it by friction. Apart from those circumstances where a certain slidability of the clip on the casing end is desirable in order to prevent too high an internal pressure of the sausage casing, the aim is usually to ensure such a firm fit of the clip that it cannot shift. Since sausage casings are often delicate, this aim cannot be achieved simply by increasing the prestress of the clip. Also, the soft structure and the presence of greasy substances, especially fat, disturb the firm fit of the clip.

It is known to give the bearing surface of the clip a longitudinal groove which is made during the extrusion of the virtually endless strip profile. It was shown, however, that a more secure fit could not be obtained even by this means, and this may be partly because the groove acts as a grease pocket. A further aggravating feature is that, as is known, those edges of the closing clips which act on the sausage casing have to be well rounded to prevent damage.

The object on which the invention is based is to improve the bonding capacity of closing clips.

In the solution according to the invention, a plurality of impressions is provided in the bearing surface so as to cover essentially its entire area.

This solution is surprising inasmuch as the experience of a longitudinal groove does not suggest that the bonding capacity can be improved by means of impressions. It was shown, however, that closing clips designed according to the invention have a substantially better bonding capacity than the known closing clips equipped with a groove, so that, in general, the known clips can be replaced by clips according to the invention of smaller thickness, in which the size of the bearing surface and the amount of prestress are correspondingly less.

The better effect of the clips according to the invention probably arises not only because a larger number of edges interacting with the casing is provided in the bearing surface, but also because these edges can be sharper. In particular, the closer the impressions are together and the smaller the individual impression width, the less risk there is that each individual edge will cut dangerously deep into the casing surface, but without the friction-improving effect of the edge sharpness being impaired thereby.

By the area-covering arrangement of the plurality of impressions is preferably meant that the length of the edges formed by the impressions per unit length of the metal strip amounts to at least approximately three length units, preferably at least 5 length units. In contrast, a longitudinal groove provides only an edge length of two length units per unit length of the metal strip.

It is also expedient, in this respect, if the length of the edges formed by the impressions amounts on average to at least approximately 2 mm/mm$^2$, preferably at least approximately 3 mm/mm$^2$ It can be expedient, furthermore, if the proportion of the bearing surface taken up by the impressions amounts to at least approximately 20%.

Contrary to the rule applicable hitherto, the edges of the impressions will be made sharp. Whereas, in a plan view of the bearing surface, the width of the edge rounding on closing clips with the known longitudinal groove is not much below 0.1 mm, in the invention this width will amount to less than 0.05 mm, appropriately less than 0.02 mm. This width can easily be established under a magnifying glass or microscope by means of the differing brightness of the surfaces mentioned. As seen in a plan view, the width of the edge rounding will also amount to less than 10% of the impression width.

It is especially favorable if the edges are raised relative to the original height of the bearing surface existing at a distance from the impressions, as occurs when the impressions are indented into the material and material is thereby displaced laterally.

A process, preferred according to the invention, for producing the closing clips is therefore defined in that the impressions are indented into the virtually endless metal strip serving for producing the clips, for example by means of a knurling wheel.

The impressions are appropriately made elongate. Whereas the design of the known groove assumed that this had to extend transversely relative to the slipping movement to be prevented and therefore in the longitudinal direction of the clip, it was shown that this is not true at least for the impressions according to the invention, even though it can be beneficial to give them a considerable directional component in the longitudinal direction. However, elongate impressions extending transversely relative to the longitudinal direction of the clips, that is to say in the direction of the sliding movement of the clips which is to be prevented, also have a favorable effect. This may be partly because elongate impressions leading laterally out of the bearing surface have a draining effect in the bearing region, as result of which lubricating greasy substances are pressed out under the bear pressure, thereby increasing the solid contact between the clip and casing. It is also advantageous, in this respect, if the impressions extending obliquely in opposite directions intersect one another, because then, if one flow-off cross-section becomes blocked, there are still other flow-off paths which communicate with the blocked flow-off path at the intersection point.

It proved expedient for the width to be on average above 0.15 mm, but on the other hand appropriately also below 0.4 mm.

If the impressions are to act as drainage cross-sections, their depth should not be substantially less than half their width. Otherwise, it is sufficient if the depth of the impressions is adequate for a marked edge formation.

Figure 2:
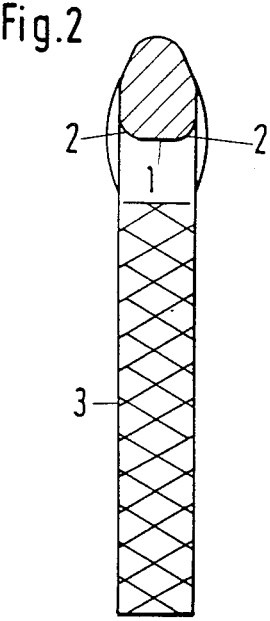
Figure 11:
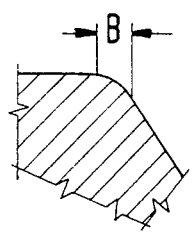
Figure 13:
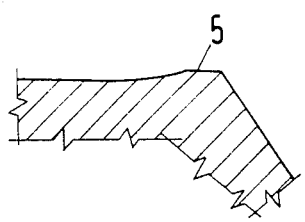

The invention is explained in detail below with reference to the drawing which illustrates advantageous exemplary embodiments. In the drawing:

FIGS. 1 and 2 show respectively a side view and a sectional view of the closing clip on an enlarged scale, FIGS. 3 to 10 show pattern variations of the impressions according the invention, and FIGS. 11 and 13 show edge cross-sections.

In the example illustrated, the cross-sectional shape of the strip, which is composed, for example, of aluminum and from which the clips are bent, is chosen so as to form a flattened bearing surface 1 which is located between edge roundings 2. The plane shape of the bearing surface is advantageous in terms of the invention, but not necessary.

Typical length and width dimensions of the closing clips shown in FIGS. 1 and 2, as used for the closing of sausage casings, are between 10 and 20 mm. The invention is not restricted to its use within this range.

FIG. 2 shows that a pattern of mutually intersecting impression lines is formed on the bearing surface of the leg 3. Appropriately, this pattern also covers the bearing surface on the web extending between the legs, including the bending regions.

The pattern according to FIG. 2 is composed of impression lines which extend at 60° relative to the longitudinal direction of the metal strip and which intersect one another, and for each impression line at least one intersection point should appropriately be located within the bearing surface.

In an exemplary embodiment tested with a good result, the impression pattern was defined by the following data:

Width of each impression line: 0.15 to 0.3 mm
Cross-sectional form of the impressions: Triangularly pointed, with a 90° acute angle at the impression bottom
Leg width: 2.5 mm
Width of the bearing surface: 1 8 mm
Angle of the impression lines relative to the longitudinal leg direction: 60°
Center distance of parallel impression lines: 1 mm
One intersection point within the bearing surface for each impression line
Edge design: Predominantly according to FIG. 13
Edge rounding: Not noticeable under magnification 25 times
Slip resistance: The same as that of a conventional clip of a width of 3 mm and of approximately 1.5 times the weight.

Figure 3:
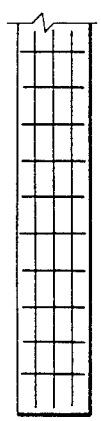
Figure 4:
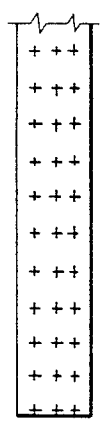
Figure 5:
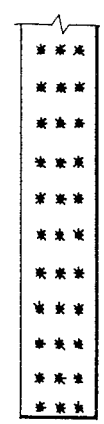
Figure 6:
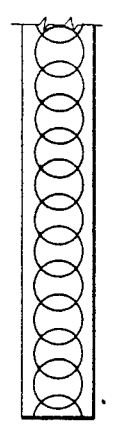
Figure 7:
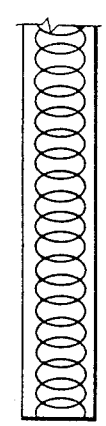
Figure 8:
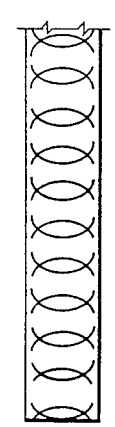
Figure 9:
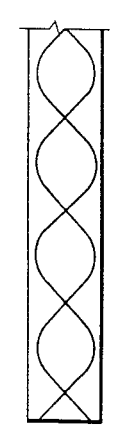
Figure 10:
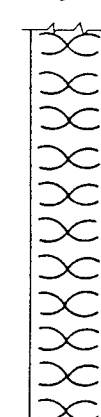

Most of the versions according to FIGS. 3 to 10 are self-explanatory, and where the versions according to FIGS. 3, 8 and 10 are concerned it is stressed that the impression lines open at the edge of the bearing surface, to generate a draining effect. The versions according to FIGS. 4 and 5 exhibit impressions which are concentrated so as to resemble dots and which are formed by several short impression zones intersecting one another in a star-like manner. In these, as in the impressions of pronounced linear form, it is possible to determine the length of the effective edge formed by them.

Figure 12:
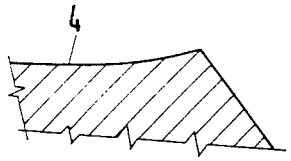

Whereas, in the conventional longitudinal groove, an edge rounding of considerable extent, as shown at B in FIG. 11, is neither avoidable nor, in terms of careful treatment, undesirable, indenting the impressions, for example by means of a knurling wheel, produces an edge of the form shown in FIG. 12, in which the ridge is raised a little above the remaining height 4 of the bearing surface 1.

Even if subsequent machining later results in a flattening 5 unintentionally or to prevent excessively sharp edges, an edge of substantially sharper form than in the state of the art nevertheless still remains.

I claim:

1. In a clip for closing the gathered end of sausage casings and the like, formed from a metal strip which is to be bent around and bear upon the casing end, the bearing surface of the clip containing a friction-increasing impression, the improvement wherein a plurality of impressions substantially cover the entire bearing surface and the length of the edges formed by the impressions per unit length of the metal strip amounts to at least approximately three length units.

2. A clip as claimed in claim 1, wherein the length of the edges formed by the impressions per unit length of the metal strip amounts to at least approximately five length units.

3. A clip as claimed in claim 1, wherein the length of the edges formed by the impressions amounts on average to at least approximately 2 mm/mm$^2$.

4. A clip as claimed in claim 1, wherein the proportion of the bearing surface taken up the impressions is at least approximately 20%.

5. A clip as claimed in claim 1 wherein the edges formed by the impressions are raised.

6. A clip as claimed in claim 1 wherein the impressions are indented.

7. A clip as claimed in claim 1 wherein the impressions are made elongate.

8. In a clip for closing the gathered end of sausage casings and the like, formed from a metal strip which is to bent around and bear upon the casing end, the bearing surface of the clip containing a friction-increasing impression, the improvement wherein a plurality of impressions substantially cover the entire bearing surface and the length of the edges formed by the impressions amounts on average to at least approximately 2 mm/mm$^2$.

9. In a clip for closing the gathered end of sausage casings and the like, formed from a metal strip which is to bent around and bear upon the casing end, the bearing surface of the clip containing a friction-increasing impression, the improvement wherein a plurality of impressions substantially cover the entire bearing surface and the proportion of the bearing surface taken up by the impressions is at least approximately 20%.

10. In a clip for closing the gathered end of sausage casings and the like, formed from a metal strip which is to bent around and bear upon the casing end, the bearing surface of the clip containing a friction-increasing impression, the improvement wherein a plurality of impressions substantially cover the entire bearing surface and the edges are made sharp.

11. A clip as claimed in claim 10, wherein, in a plan view of the bearing surface (1), the width of the edge rounding (B) amounts to less than 0.05 mm.

12. A clip as claimed in claim 10, wherein, as seen in a plan view, the width (B) of the edge rounding amounts to less than 10% of the impression width.

13. In a clip for closing the gathered end of sausage casings and the like, formed from a metal strip which is to bent around and bear upon the casing end, the bearing surface of the clip containing a friction-increasing impression, the improvement wherein a plurality of impressions substantially cover the entire bearing surface and the width of the impressions is on average above 0.15 mm.

14. A clip as claimed in claim 13, wherein the width of the impression is on average below 0.4 mm.

15. In a clip for closing the gathered end of sausage casings and the like, formed from a metal strip which is to bent around and bear upon the casing end, the bearing surface of the clip containing a friction-increasing impression, the improvement wherein a plurality of impressions substantially cover the entire bearing surface and the impressions intersect one another.

* * * * *